B. D. PINKNEY.
DOUGH MIXING AND STRETCHING MACHINE.
APPLICATION FILED APR. 9, 1920.

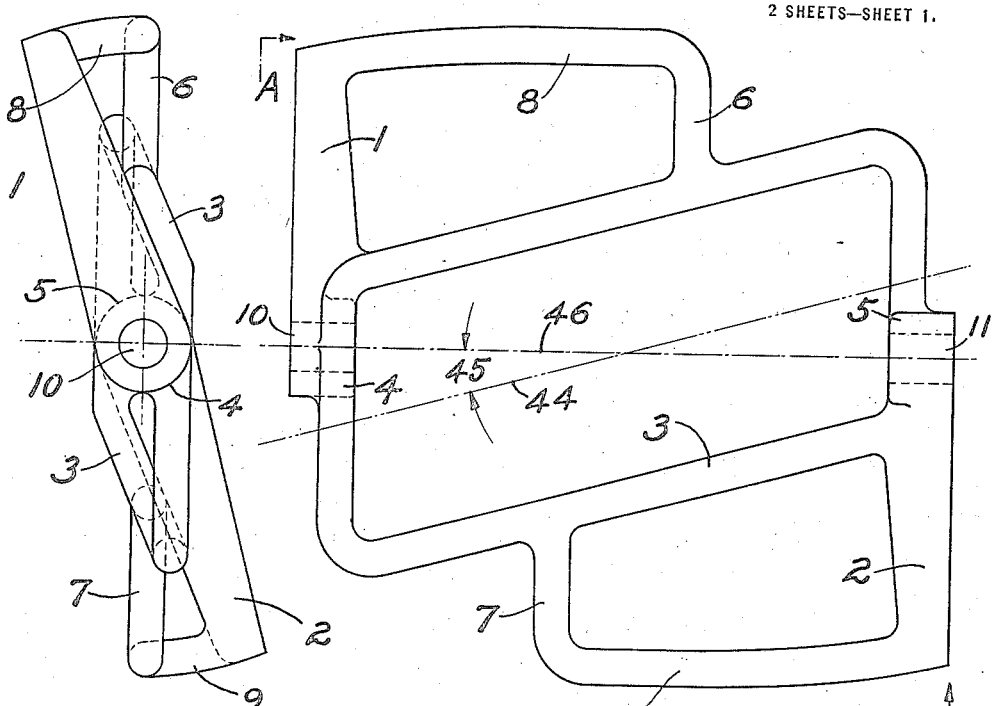
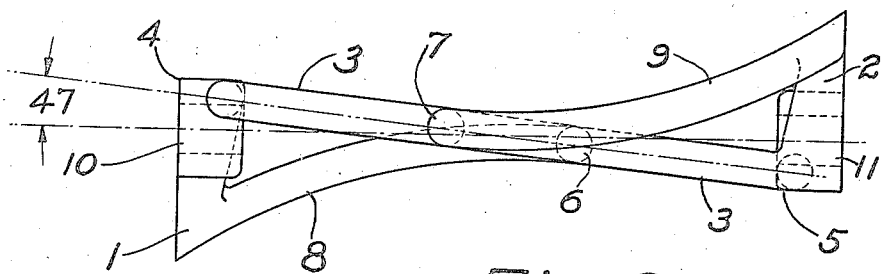

1,363,434.

Patented Dec. 28, 1920.
2 SHEETS—SHEET 2.

Inventor:
Bryant D. Pinkney.

UNITED STATES PATENT OFFICE.

BRYAN D. PINKNEY, OF NEWPORT, KENTUCKY.

DOUGH MIXING AND STRETCHING MACHINE.

1,363,434.   Specification of Letters Patent.   Patented Dec. 28, 1920.

Application filed April 9, 1920. Serial No. 372,450.

*To all whom it may concern:*

Be it known that I, BRYAN D. PINKNEY, a citizen of the United States, residing at 10 East Third street, Newport, in the county of Campbell and State of Kentucky, have invented certain new and useful Improvements in Dough Mixing and Stretching Machines, of which the following is a specification.

My invention relates to improvements in machines for the mixing, kneading and stretching of dough, and similar masses of a doughy or plastic nature, in which a single mixing-arm is employed; and the objects of my invention are, first, to subject the contents to a thorough mixing, causing the dry and liquid ingredients to become correctly blended and mixed, and then to assume the form of a partially cohesive mass; and second, by the continued action of the mixing-arm, to so completely stretch and knead the dough or plastic mass, that plenty of air is worked in and the mass aerated and "smoothed up," so that the resulting chemical action develops the gluten in the flour, makes the mass prove well, and makes a whiter, finer-grained and larger loaf for the same weight.

I attain these objects by the mechanism illustrated in the accompanying drawings, in which—

Figure 4:
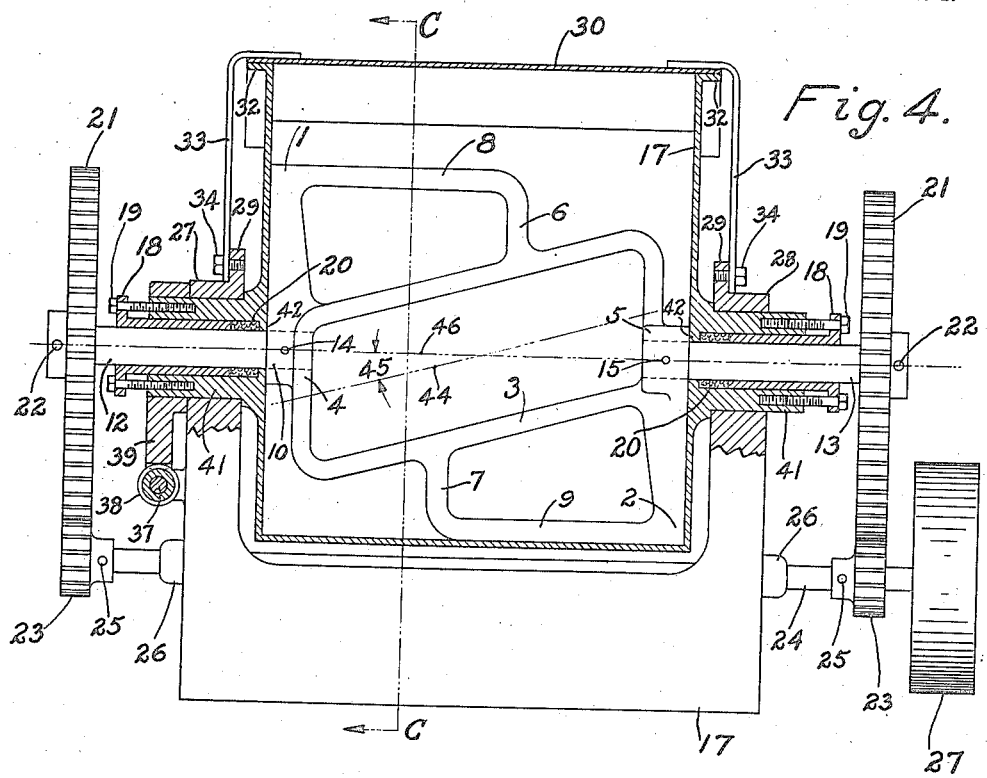
Figure 5:
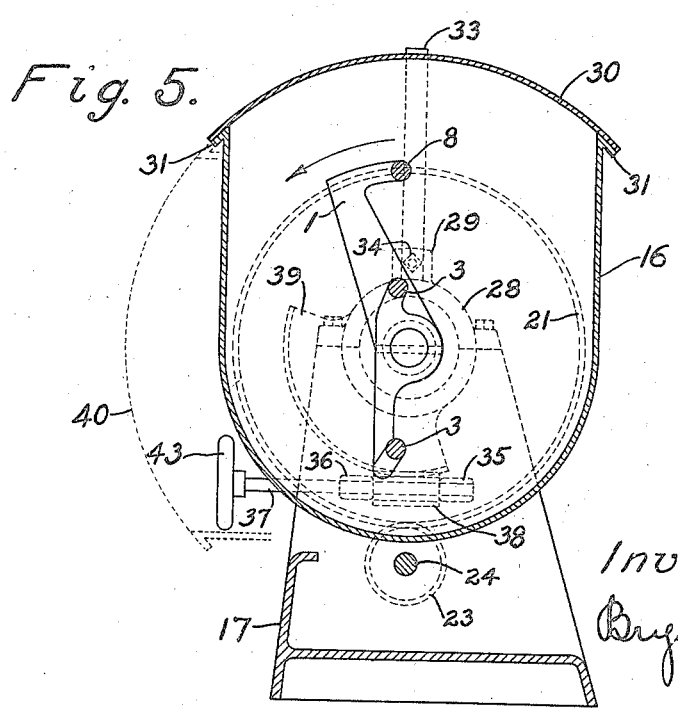

Figure 1 is a vertical view of the mixing-arm; Fig. 2, an end view of the mixing arm looking in the direction of "A," Fig. 1; Fig. 3, a horizontal side view of the mixing arm looking in the direction of "B," Fig. 1; Fig. 4, a front view of my improved dough mixing and stretching machine, showing the mixing-arm in its vertical position, partially sectioned; Fig. 5, a transverse section taken at line "C—C," Fig. 4.

Similar numerals refer to similar parts throughout the several views.

Referring to the drawings, 1 and 2 are diametrically-opposed end scraping members of the mixing-arm 3, and 4 and 5 are oppositely-disposed elevated end members of said mixing-arm. The members 6 and 7 connect the mixing-arm 3 with oppositely-disposed thrust bars 8 and 9 which connect with the end scraping members 1 and 2. Holes 10 and 11 are bored in hubs at the oppositely-disposed elevated end members 4 and 5 in which are fastened shafts 12 and 13 by any suitable means, such as by pins 14 and 15.

The mixing-arm 3 has its axis 44 at a vertical obliquity 45 with the axis of rotation 46. The plane of the said mixing-arm also is at a horizontal obliquity 47 with the axis of rotation 46, and this imparts to the mixing-arm 3 a double oscillatory or gyratory movement,—one due to the vertical obliquity 45 of its axis in relation to the plan of the mixing-arm, and the other due to the horizontal obliquity 47 of its axis in relation to the plane or side view of the mixing-arm. This principle and construction works the mass back and forth very vigorously, and the oscillatory or gyratory actions above described, in respect to the resistance of the receptacle 16, both stretches and kneads the mass.

The bowl or receptacle 16 is provided with trunnions 41 and journaled in the frame 17 at the caps 28. The stuffing-boxes 18 and adjusting screws 19 serve to tighten the fibrous packing 20 against the shoulder 42 of the receptacle 16 so that the liquids cannot leak from the receptacle 16, or grease work into said receptacle. On shafts 12 and 13 are mounted the gears 21, and secured by any suitable means, such as by the pins 22. Meshing with gears 21 are pinions 23, mounted on shaft 24 and secured thereto by pins 25. Shaft 24 is journaled in the frame 17 and held in alinement by collars 26.

Motive power is applied to my improved dough mixing and stretching machine by means of a pulley 27, or any other suitable means.

On caps 28 are lugs 29 to which are fastened the supporting bars 33 by means of the screws 34. The supporting bars 33 are fastened to canopy cover 30 by any suitable means. Front and rear projections 31 and side projections 32 are integral with the receptacle 16 to form a seat for the canopy cover.

On frame 17 are projections 35 and 36 in which is journaled a shaft 37. On shaft 37 is rigidly secured a worm 38 which meshes with a chordal wormwheel 39 rigidly mounted on trunnion 41, to dump or tilt the receptacle 16, as shown at 40, for emptying or discharging purposes. Shaft 37 is provided with suitable means for manual operation, such as a handwheel 43.

The operation of my improved dough mixing and stretching machine is as follows: The ingredients to be mixed (usually for bread doughs, which comprise flour, salt, sugar, lard, yeast and water) are placed in receptacle 16, either through an opening in canopy cover 30 (not shown in the drawings) or while the receptacle 16 is partially tilted, either just before the dough mixing and stretching machine is operated, or while it is being operated. The ingredients generally are such that must first be blended (which blending takes place in the mixing process before the ingredients assume the form of a cohesive mass), and then stretched and kneaded. The oppositely - disposed thrust bars 8 and 9, on account of their side-thrust action while rotating, work the unmixed portion of the ingredients back and forth until they are of sufficient consistency that they will yield to the stretching and kneading action of the mixing-arm 3. The end scraping members 1 and 2 scrape the mass from the end walls of the receptacle 16, and the oppositely-disposed thrust bars 8 and 9 work in close proximity with the curved wall of the receptacle 16 so that a scraping action results. This double oscillatory or gyratory action of the mixing-arm makes a cool dough of maximum strength in a minimum of time, and increases volume by aeration and consequent increased absorption.

Other modes of applying the principle of my invention may be employed instead of the one explained, provided the means stated by any of the following claims or the equivalent of such stated means be employed.

Having thus described my invention, what I claim as new, and desire to secure by Letters Patent, is—

1. In a dough mixing and stretching machine, the combination of a mixing receptacle, a mixing-arm, and mechanism for imparting rotary speed to said mixing-arm; said mixing-arm being composed of two diverging mixing bars disposed at obliquities with the axis of rotation in respect to its horizontal and its vertical axes.

2. In a dough mixing and stretching machine, the combination of a mixing receptacle, a mixing-arm, and mechanism for imparting rotary speed to said mixing-arm; said mixing-arm being composed of two diverging mixing bars disposed at obliquities with the axis of rotation in respect to its horizontal and its vertical axes, and two integral oppositely-disposed end scraping and thrust bars working in close proximity to the curved wall of said mixing receptacle and disposed at an opposite obliquity to said mixing-arm bars in respect to its horizontal axis.

In testimony whereof I affix my signature.

BRYAN D. PINKNEY.